Jan. 6, 1948.     C. Q. SNEDEKER     2,434,017
ANTISKID DEVICE
Filed May 8, 1945
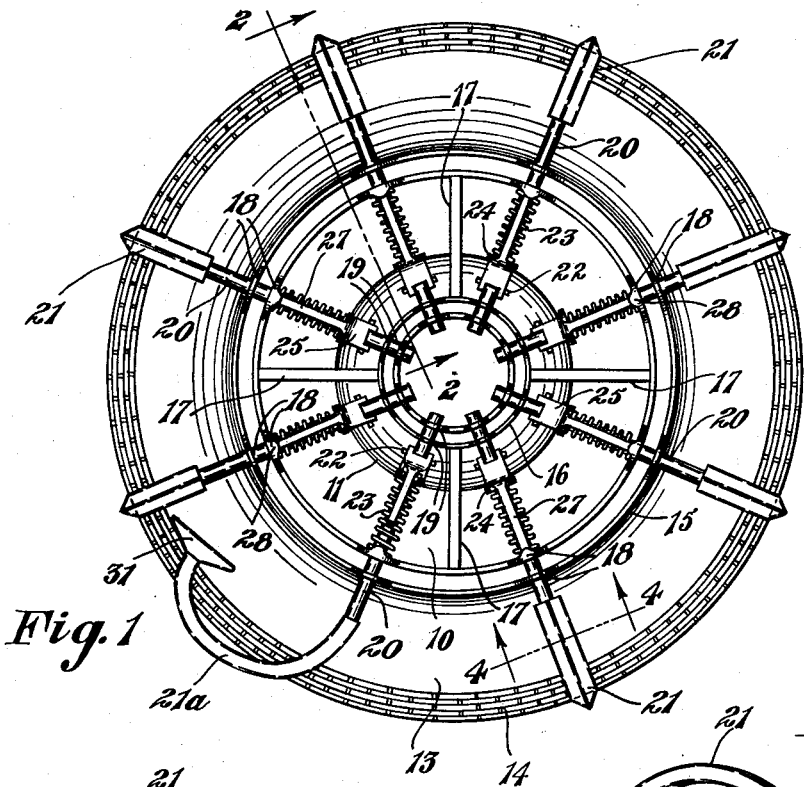
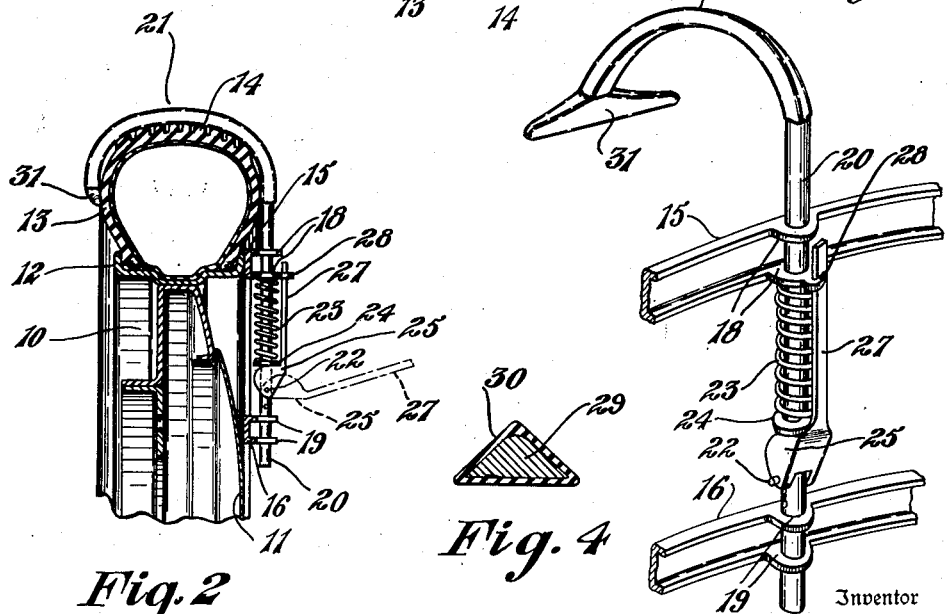
Inventor
Claude Q. Snedeker
By Frease and Bishop
Attorneys Patented Jan. 6, 1948

2,434,017

UNITED STATES PATENT OFFICE 2,434,017

ANTISKID DEVICE

Claude Q. Snedeker, Canton, Ohio

Application May 8, 1945, Serial No. 592,553

9 Claims. (Cl. 152—216)

The invention relates to anti-skid devices for the tires of automobiles and similar vehicles and more particularly to an anti-skid device which may be easily and readily placed upon, or removed from, a tire without the necessity of jacking up the wheel.

The well known Weed chain is probably the most practical and widely used anti-skid device for automobile tires which has come into actual use, but there are several disadvantages and difficulties encountered in the use of such tire chains.

They are difficult and bothersome to put on, requiring that the wheel be jacked up, and it is necessary that the operator connect the ends of the chain upon the inner, or car side of the wheel as well as upon the outer side, which is in itself a difficult and inconvenient task.

Furthermore, these chains are not only hard upon the tires, but they are noisy when a section of bare pavement is encountered, and they quickly wear through and break under such conditions.

It is an object of the present invention to provide an anti-skid device which overcomes the disadvantages and difficulties encountered in the ordinary tire chains.

Another object is to provide an anti-skid device which may be quickly and easily placed upon a tire without requiring that the wheel be jacked up.

A further object is to provide an anti-skid device which may be easily placed upon a tire entirely from the outer side of the wheel.

A still further object is to provide an anti-skid device which will not be hard upon the tire and which will not be noisy or wear out rapidly when driven over a section of bare pavement.

Another object of the invention is to provide an anti-skid device comprising a ring adapted to lie against the outer side of an automobile wheel and carrying a plurality of radially disposed, spring loaded hooks for engaging over the tread portion of the tire, said hooks being swivelled so as to lie in substantially the normal plane of the ring when not in use, a tensioning device being provided for the spring of each hook to hold the same snugly upon the tire when in use.

The above objects, together with others which will be apparent from the drawing and following description, or which may be later referred to, may be attained by constructing the improved anti-skid device in the manner illustrated in the accompanying drawing, in which:

Figure 1 is a side elevation of an automobile wheel and tire, showing the improved anti-skid device mounted thereon;

Fig. 2 a transverse sectional view, taken as on the line 2—2, Fig. 1, showing the manner in which each hook is engaged over the tread portion of the tire and held in this position when in use;

Fig. 3 a detached perspective view of one of the hooks, and

Fig. 4 an enlarged, cross sectional view through one of the hooks.

Referring to the drawing, in which a preferred embodiment of the invention is illustrated, an automobile wheel is indicated generally at 10, provided with the usual hub cap 11 and rim 12 in which is mounted a tire 13 having the tread portion 14. All of the above parts may be of any usual and conventional construction and form no part of the invention, but are illustrated to show the manner in which applicant's novel anti-skid device may be applied thereto.

The anti-skid device to which the invention pertains comprises a ring or annulus 15, which is preferably of substantially the same diameter as the rim 12, and adapted to lie against the same, as best shown in Fig. 2, when the anti-skid device is in use upon the wheel. This ring may be a sheet metal stamping of channel cross section as illustrated.

If desired, a second, smaller ring 16 preferably of less diameter than the diameter of the hub cap 11 of the wheel, may be concentrically located within the ring 15, and may be attached thereto as by the spokes 17.

The ring 15 is provided at spaced intervals with bearing ears 18, and where the smaller ring 16 is also used in the device, as in the form illustrated, similar bearing ears 19 may be formed thereon and radially aligned with the ears 18 upon the ring 15.

A radially disposed rod 20 is slidably mounted through each radially aligned pair of bearing ears 18 and 19 and the outer end of each of these rods may be of spring material and is curved or hooked to fit over the tread portion of the tire as indicated generally at 21.

A shoulder, in the form of a pin 22 is fixed upon each rod 20, at a point intermediate the bearing ears 18 and 19, and a coil spring 23 surrounds each rod between said shoulder and the bearing ears 18 to normally urge the rod inward toward the corresponding bearing ears 19.

The inner end of each spring 23 may bear against the corresponding shoulder or pin 22, but the purpose of increasing the tension upon the spring, as will be hereinafter described, a collar or washer 24, slidably mounted upon each rod, may be interposed between the inner end of each spring 23 and the corresponding pin 22.

In order to increase the tension upon the springs 23 so as to hold the hooked portions 21 of the rods 20 against outward movement by centrifugal force when the vehicle is in motion, an eccentric cam 25 may be pivoted upon each pin 22, and adapted to be moved into the operative position shown in the drawings engaging the slidable collar 24 and compressing the spring 23 as best shown in Fig. 2, the lever portion 27 of the cam being swung inward toward the rod and held against movement by engaging under the lug 28 upon the adjacent bearing ear 18.

The hook portion 21 of each rod is preferably of triangular cross section, as best shown at 29 in Fig. 4, and may be covered with rubber or the like as indicated at 30 and may have the T head 31 swiveled thereon and adapted to lie against the inner side of the tire and prevent turning movement of each rod 20 and its hook portion 21 when the same is positioned for use upon the tire as shown in Figs. 1 and 2.

When the device is not in use the rods 20 may be rotated in their bearing so that each hook portion 21 lies in substantially the normal plane of the device, as indicated at 21a in the lower left portion of Fig. 1.

When it is desired to attach the anti-skid device to a tire it is not necessary that the tire be raised above the ground, as the device may be applied and attached entirely from the outer side of the wheel. To accomplish this, two or three of the rods 20 at the upper portion of the device may be given a quarter turn so that the hooks are in position to engage over the tire and they may be engaged over the rim of the tire in this manner.

Each of the other rods 20 may then be engaged over the tread of the tire one at a time. To accomplish this the cam 25 is first thrown out to the broken line position shown in Fig. 2, releasing the tension upon the spring 23 so that the rod may be manually pulled radially outward and axially turned so that the hook portion 21 thereof will engage over the tread of the tire.

When all of the hook portions 21 of the rods are engaged over the tread of the tire the eccentric cams 25 may be moved to the position best shown in Fig. 2 compressing the springs 23 and putting sufficient tension thereon to prevent the rods from throwing radially outward by centrifugal force by movement of the vehicle.

From the above it will be seen that a simple, easily operated anti-skid device is provided which may be quickly and easily attached to the tire from the outer side of the wheel without the necessity of raising the wheel from the ground and without requiring the operator to crawl or reach beneath the car to make any connections from the inner side of the wheel.

I claim:

1. An anti-skid device for a tire, comprising a ring of smaller diameter than the tire and concentrically located on the outer side of the tire, a plurality of radially disposed rods slidably mounted upon the ring, hook portions at the outer ends of the rods engaging over the tread of the tire, spring means for urging the rods inwardly and means for increasing the tension upon the spring means, and a T-head swivelled upon the end of each hook portion bearing against the inner side of the tire.

2. An anti-skid device for a tire, comprising a ring of smaller diameter than the tire and concentrically located on the outer side of the tire, a plurality of radially disposed rods slidably mounted upon the ring, hook portions at the outer ends of the rods engaging over the tread of the tire, spring means for urging the rods inwardly and eccentric cam means for increasing the tension upon the spring means, and a T-head upon the end of each hook portion bearing against the inner side of the tire.

3. An anti-skid device for a tire, comprising a ring of smaller diameter than the tire and concentrically located on the outer side of the tire, a smaller ring concentrically mounted within the first named ring, a plurality of radially disposed rods slidably mounted upon the rings, hook portions at the outer ends of the rods engaging over the tread of the tire, spring means for urging the rods inwardly an eccentric cam pivoted upon each rod and engaging the inner end of the spring for increasing the tension upon the spring means, a lever upon each eccentric cam and means upon the first named ring for locating said levers in position parallel to the rods 4. An anti-skid device for a tire, comprising a ring of smaller diameter than the tire and concentrically located on the outer side of the tire, a smaller ring concentrically mounted within the first named ring, means connecting said rings together, a plurality of radially disposed rods slidably mounted upon the rings, hook portions at the outer ends of the rods engaging over the tread of the tire a T-head upon the end of each hook portion and bearing against the inner side of the tire, spring means for urging the rods inwardly and means for increasing the tension upon the spring means.

5. An anti-skid device for a tire, comprising a ring of smaller diameter than the tire and concentrically located on the outer side of the tire, a plurality of radially disposed rods slidably mounted upon the ring, hook portions at the outer ends of the rods engaging over the tread of the tire, spring means for urging the rods inwardly and means for increasing the tension upon the spring means and a T-head upon the end of each hook portion bearing against the inner side of the tire.

6. An anti-skid device for a tire, comprising a ring of smaller diameter than the tire and concentrically located on the outer side of the tire, a plurality of radially disposed rods slidably mounted upon the ring, hook portions at the outer ends of the rods engaging over the tread of the tire, spring means for urging the rods inwardly, an eccentric cam pivoted upon each rod and engaging the inner end of the spring for increasing the tension upon the spring means, a lever upon each eccentric cam, means upon the ring for locating said levers in position parallel to the rods and a T-head upon the end of each hook portion and bearing against the inner side of the tire.

7. An anti-skid device for a tire, comprising a ring of smaller diameter than the tire and concentrically located on the outer side of the tire, a smaller ring concentrically mounted within the first named ring, means connecting said rings together, a plurality of radially disposed rods slidably mounted upon the rings, hook portions at the outer ends of the rods engaging over the tread of the tire, a T-head swivelled upon the end of each hook portion and bearing against the inner side of the tire, spring means for urging the rods inwardly and means for increasing the tension upon the spring means.

8. An anti-skid device for a tire, comprising a ring of smaller diameter than the tire and concentrically located on the outer side of the tire, a smaller ring concentrically mounted within the first named ring, means connecting said rings together, a plurality of radially disposed rods slidably mounted upon the rings, hook portions in the outer ends of the rods engaging over the tread of the tire, a T-head upon the end of each hook portion and bearing against the inner side of the tire, a coil spring around each rod between the rings for urging the rods inwardly, an eccentric cam pivoted upon each rod for engaging the inner end of the spring for increasing the tension upon the spring, a lever upon each eccentric cam for operating the same and means upon the first named ring for locating said levers in position parallel to the rods.

9. An anti-skid device for a tire, comprising a ring of smaller diameter than the tire and concentrically located on the outer side of the tire, a smaller ring concentrically mounted within the first named ring, means connecting said rings together, a plurality of radially disposed rods slidably mounted upon the rings, hook portions in the outer ends of the rods engaging over the tread of the tire, a T-head swivelled upon the end of each hook portion and bearing against the inner side of the tire, a coil spring around each rod between the rings for urging the rods inwardly, an eccentric cam pivoted upon each rod for engaging the inner end of the spring for increasing the tension upon the spring, a lever upon each eccentric cam for operating the same and means upon the first named ring for locating said levers in position parallel to the rods.

CLAUDE Q. SNEDEKER.

REFERENCES CITED

The following references are of record in the file of this patent:

UNITED STATES PATENTS

| Number | Name | Date |
|---|---|---|
| 1,079,273 | Standish | Nov. 18, 1913 |
| 1,257,145 | Stern | Feb. 19, 1918 |
| 1,600,276 | Dombowsky | Sept. 21, 1926 |
| 1,786,653 | Hathorne | Dec. 30, 1930 |
| 1,837,708 | Frank | Dec. 22, 1931 |
| 1,867,773 | Spidla | July 19, 1932 |